US012456862B2

(12) United States Patent
Lebeau et al.

(10) Patent No.: US 12,456,862 B2
(45) Date of Patent: Oct. 28, 2025

(54) ELECTRICITY DISTRIBUTION SYSTEM FOR A DOMESTIC INSTALLATION COMPRISING MULTIPLE ELECTRICAL SOURCES

(71) Applicant: Schneider Electric Industries SAS, Rueil Malmaison (FR)

(72) Inventors: Bernard Lebeau, Les Adrets (FR); Etienne Du Port De Poncharra, Crets en Belledonne (FR); Emmanuel Bur, La Buisse (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/947,268

(22) Filed: Sep. 19, 2022

(65) Prior Publication Data

US 2023/0096943 A1  Mar. 30, 2023

(30) Foreign Application Priority Data

Sep. 24, 2021  (FR) ...................................... 2110100
Jan. 14, 2022  (EP) ...................................... 22305033
Jul. 29, 2022  (EP) ...................................... 22306155

(51) Int. Cl.
*H02J 3/00* (2006.01)
*B60L 50/60* (2019.01)
(Continued)

(52) U.S. Cl.
CPC .............. *H02J 3/007* (2020.01); *B60L 50/60* (2019.02); *H02B 1/20* (2013.01); *H02J 3/04* (2013.01); *H02J 3/381* (2013.01); *H02J 2300/24* (2020.01)

(58) Field of Classification Search
CPC .... H02J 3/007; H02J 3/04; H02J 3/381; H02J 2300/24; H02J 2203/10; H02J 2310/52;
(Continued)

(56) References Cited

U.S. PATENT DOCUMENTS

| 8,390,977 | B2 * | 3/2013 | Fife .......................... H02H 9/04 361/118 |
| 2009/0058191 | A1 * | 3/2009 | Nordman .................. H02G 3/08 307/112 |

(Continued)

FOREIGN PATENT DOCUMENTS

| FR | 2432789 A1 | 2/1980 |
| WO | 2016176727 A1 | 11/2016 |
| WO | 2018234330 A1 | 12/2018 |

*Primary Examiner* — Richard Tan
(74) *Attorney, Agent, or Firm* — Wolf, Greenfield & Sacks, P.C.

(57) ABSTRACT

An electricity distribution system for a domestic installation including multiple electrical sources. The system includes a connecting device arranged for distributing an electric current in the installation, from sources including an electricity distribution network and at least one auxiliary electrical supply source, to at least one electricity consuming load, the connecting device including at least one linear segment, each linear segment including a plurality of electrical conductors adapted to route the electric current along an electrical conduction path. The system further includes a switching device principal configured for switching between two states which, respectively, allow or prevent the flow of electric current from the electricity distribution network to the connecting device, an auxiliary switching device for each auxiliary electrical supply source being configured for switching between two states which, respectively, allow or prevent the flow of electric current from the associated auxiliary electrical supply source to the connecting device. The system further includes at least one load switching
(Continued)

device configured for switching between two states which, respectively, allow or prevent the flow of electric current from the connecting device to at least one electricity consuming load, the or each load switching device being electrically connected to the connecting device at an intermediate connection point between said first connection point and the or each second connection point.

14 Claims, 9 Drawing Sheets

(51) Int. Cl.
    *H02B 1/20* (2006.01)
    *H02J 3/04* (2006.01)
    *H02J 3/38* (2006.01)

(58) Field of Classification Search
    CPC ... H02J 3/06; B60L 50/60; H02B 1/20; Y02B 10/10; Y02E 10/56
    USPC .......................................................... 307/9.1
    See application file for complete search history.

(56) References Cited

U.S. PATENT DOCUMENTS

| | | | |
|---|---|---|---|
| 2016/0072292 A1* | 3/2016 | Rogers | H02J 3/466 307/62 |
| 2018/0131226 A1* | 5/2018 | Narla | H02J 7/35 |
| 2019/0170120 A1* | 6/2019 | Hald | F03D 7/028 |
| 2020/0220354 A1 | 7/2020 | Berenger et al. | |
| 2020/0336003 A1* | 10/2020 | Narla | H02J 3/381 |
| 2021/0083506 A1 | 3/2021 | Rao et al. | |

\* cited by examiner

ELECTRICITY DISTRIBUTION SYSTEM FOR A DOMESTIC INSTALLATION COMPRISING MULTIPLE ELECTRICAL SOURCES

CROSS-REFERENCE TO RELATED APPLICATIONS

This application claims priority to European Patent Application Serial No. 22306155.7, filed on Jul. 29, 2022. This application also claims priority to European Patent Application Serial No. 22305033.7, filed on Jan. 14, 2022. This application also claims priority to and the benefit of French Patent Application No. 2110100, filed on Sep. 24, 2021.

TECHNICAL FIELD

The invention relates to an electricity distribution system for a domestic installation.

BACKGROUND

At the present time, domestic electricity distribution installations are commonly supplied by multiple electrical sources, for example a public electricity distribution network and a local supply source such as one or more photovoltaic (PV) generators.

The term "domestic installation" is used for the case of residential electricity distribution installations, but also for the case of electricity distribution installations having a comparable electricity consumption, such as commercial or office buildings.

The local supply sources are often connected to existing distribution installations. This is the case, for example, when photovoltaic generators are fitted on a building that is already provided with an installation for distributing electricity from an electricity distribution network (or "grid").

For reasons of cost and ease of installation, these local supply sources are often connected downstream of the incoming feeder of the electricity distribution network (grid), at the sides of the distribution switchboards for distributing electricity to the loads.

In such distribution installations, the main supply source, that is to say the electricity distribution network, is associated with a main circuit breaker, connected so as to protect the local installation (for example, the distribution panel in the case of a domestic installation) if the current from the distribution network exceeds a predetermined current threshold (I_grid). However, in such a distribution installation the main circuit breaker cannot protect the local installation in a case where the total electric current (I_total), equal to the sum of the current from the network (I_grid) and the current from the local source (I_PV), exceeds a safety threshold I_threshold (63 amperes, for example) when both sources are generating electricity that is consumed by the loads of the domestic installation, because the main circuit breaker is not located on the same branch of the installation as the local supply source.

This situation may give rise to serious safety problems such as a risk of fire, and must therefore be avoided.

Consequently there is a need for a domestic electrical installation that enables one or more auxiliary supply sources to be connected easily at the side of the incoming feeder from the supply network, without compromising the safety of the installation.

In particular, the installation must be easy to set up, so that it can be easily installed by electricians without the need to construct complex distribution switchboards requiring a large number of connectors and connecting wires, which are time-consuming and expensive to set up.

SUMMARY

To this end, the invention proposes, according to one aspect, an electricity distribution system for distributing electric current between an electricity distribution network and a domestic distribution installation, in which the electricity distribution system comprises a connecting device arranged for distributing an electric current in the installation, from sources comprising an electricity distribution network and at least one auxiliary electrical supply source, to at least one electricity consuming load.

This system is such that the connecting device comprises at least one linear segment, each line segment comprising a plurality of electrical conductors adapted for routing the electric current along an electrical conduction path, the system comprising a main switching device, connected between the electricity distribution network and a first end connection point of the connecting device, located near a first end of the connecting device, the main switching device being configured for switching between two states which, respectively, allow or prevent the flow of electric current from the electricity distribution network to the connecting device, for the, or each, auxiliary electrical supply source, an auxiliary switching device, connected between said auxiliary electrical source and a second end connection point of the electrical connecting device, the or each second end connection point being located near a second end of the connecting device, opposite the first end, the auxiliary switching device being configured for switching between two states which, respectively, allow or prevent the flow of electric current from the associated auxiliary electrical supply source to the connecting device, the electricity distribution system further comprising at least one load switching device, connected between at least one load and the connecting device, the load switching device being configured for switching between two states which, respectively, allow or prevent the flow of electric current from the connecting device to at least one electricity consuming load, the, or each, load switching device being electrically connected to the connecting device at an intermediate connection point located between said first end connection point and the, or each, second end connection point.

More generally, this document proposes an electricity distribution system for distributing electric currents between an electricity distribution network and a domestic distribution installation, in which the electricity distribution system comprises:

a connecting device arranged for distributing an electric current in the installation, from sources comprising an electricity distribution network and at least one auxiliary electrical supply source, to at least one electricity consuming load, the system being characterized in that the connecting device comprises at least one linear segment, each linear segment comprising a plurality of electrical conductors adapted for routing the electric current along an electrical conduction path, the system comprising a main switching device, connected between the electricity distribution network and a first connection point, the main switching device being configured for switching between two states which, respectively, allow or prevent the flow of electric current from the electricity distribution network to the connecting device, for the, or each, auxiliary electrical supply source, respectively, an auxiliary switching device, connected between said auxiliary electrical source and a second connection point, each auxiliary switching device being configured for switching between two states which, respectively, allow or prevent the flow of electric current from the associated auxiliary electrical supply source to the connecting device, the electricity distribution system further comprising at least one load switching device, connected between at least one load and the connecting device, the load switching device being configured for switching between two states which, respectively, allow or prevent the flow of electric current from the connecting device to at least one electricity consuming load, the, or each, load switching device being electrically connected to the connecting device at an intermediate connection point which is located, electrically, between said first connection point and the, or each, second connection point.

Advantageously, the proposed electricity distribution system is compact, because of the particular arrangement of the connecting device, and its installation by electricians is particularly easy. Advantageously, the safety of the electricity distribution system is ensured by the connecting device (or distributor) and the respective switching devices.

The electricity distribution system according to the invention may also have one or more of the following characteristics, considered individually or in all technically feasible combinations:

The first connection point is a first end connection point of the connecting device, located near a first end of the connecting device, and the second connection point is a second end connection point of the electrical connecting device, the, or each, second end connection point being located near a second end of the connecting device, opposite the first end.

In said connecting device, each electrical conductor is a busbar made of an electrically conductive material, each busbar being associated with an electrical phase or with a neutral conductor.

Each conductor is formed by a plurality of conductive sections, electrically connected to form a busbar.

The electrical conductors of the connecting device are calibrated to route a current at a maximum current threshold, the maximum current threshold being equal to the maximum of the maximum electric current supplied by the electricity distribution network and the sum of the maximum electric currents supplied by the auxiliary electrical source or the plurality of auxiliary electrical sources.

At least one of the auxiliary electrical supply sources is a hybrid source, configured for supplying or consuming an electric current, the or each hybrid source being connected to the connecting device at a connection point which is located, electrically, between the or each second connection point and the or each intermediate connection point.

At least one hybrid source is a battery electrical storage system or an electric vehicle.

At least one electricity consuming load is an electric vehicle.

The auxiliary supply sources comprise one or more photovoltaic generators.

The system further comprises a lightning protection device, connected to the connecting device at the side of the main switching device, particularly opposite the second end.

The electricity distribution system comprises indicator elements, positioned on a visible face of a casing comprising the connecting device, for guiding the connection of the distribution network, the auxiliary electrical supply sources and the loads in the electricity distribution system.

The connecting device is linear.

The, or each, load switching device is electrically connected to the connecting device at an intermediate connection point located between said first end connection point and the, or each, second end connection point.

According to another aspect, the invention relates to an electrical installation, notably for domestic use, comprising an electricity distribution system as briefly described above.

BRIEF DESCRIPTION OF THE DRAWINGS

Other characteristics and advantages of the invention will be apparent from the description of it given below, for illustrative purposes and in an entirely non-limiting way, with reference to the attached drawings, of which.

DETAILED DESCRIPTION

Figure 1:
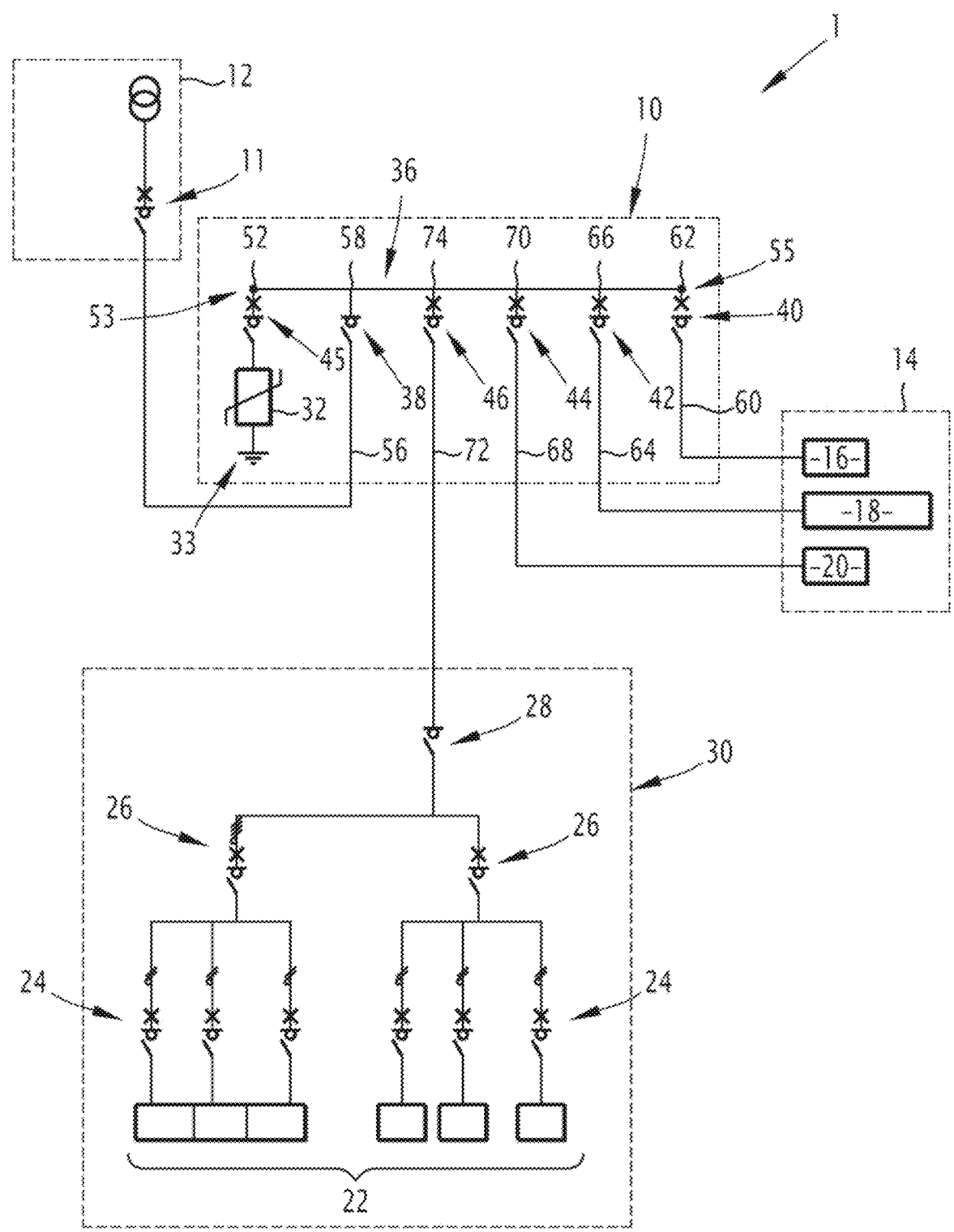
FIG. 1 shows schematically an electrical installation comprising an electricity distribution system according to a first embodiment.
Figure 2:
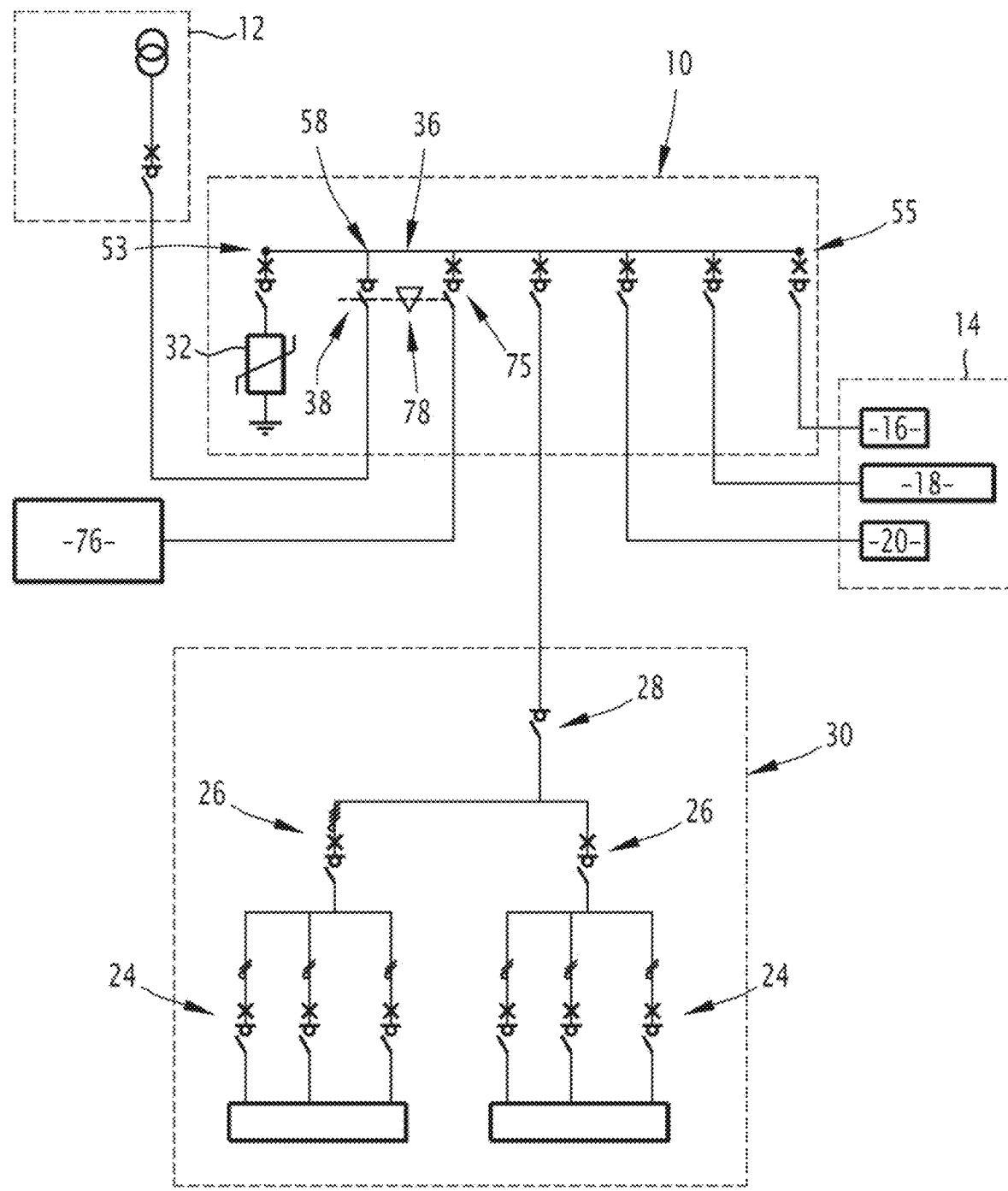
FIG. 2 shows schematically an electrical installation comprising an electricity distribution system according to a second embodiment.
Figure 3:
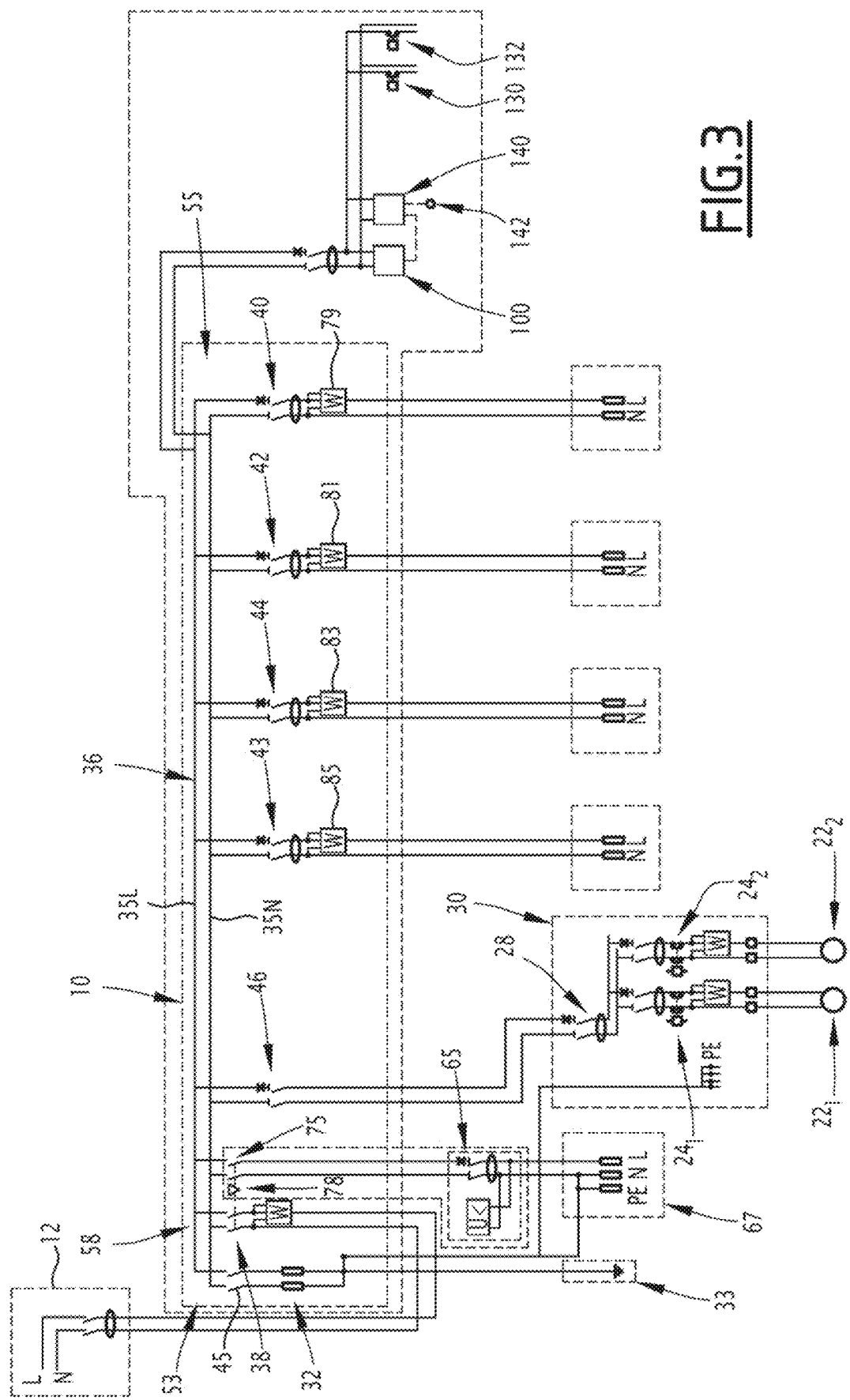
FIG. 3 shows schematically an electrical installation comprising an electricity distribution system in the case of single-phase distribution.

FIGS. 1 to 3 show schematically embodiments of an electricity distribution system 10 corresponding to the invention for a domestic installation 1.

The same reference numerals are used for the common elements in these figures.

In the schematic representations of FIGS. 1 and 2, the electrical connections are represented by single lines (single-wire connections), but it is to be understood that the systems described may be used in a similar manner for a single-phase installation having one phase conductor and one neutral conductor or for a polyphase installation having a number N of phases. For example, a polyphase installation may be three-pole, comprising three phase conductors, or four-pole, comprising four phase conductors and a neutral conductor.

"Connection point" is taken to mean a point comprising electrical connection terminals, and a connection point may be single-phase or polyphase (e.g. three-phase) as the case may be.

In numerous embodiments, at least some of the components of the system 10 are housed in an electrical panel, which may be at least partially installed in an electrical panel (a wall-mounted panel, for example) or in an electrical cabinet.

The electricity distribution system 10 is configured to be supplied by a main electrical supply source 12, which is preferably an electricity distribution network 12 (or "grid"), and by at least one auxiliary supply source 14, and to supply a plurality of loads with electricity. The number and kind of auxiliary electrical supply sources 14 may differ according to the possible embodiments.

The electricity distribution network 12 is connected to the electricity distribution system 10 through an electrical protection device 11, for example a circuit breaker, or a fuse, or a power limiting meter.

In the illustrated example, a plurality of auxiliary supply sources 14 are available.

In the illustrated embodiment, one of the auxiliary supply sources is a photovoltaic energy source or a photovoltaic generator (e.g. photovoltaic panels) 16. In a variant, the electrical installation 1 may have a plurality of photovoltaic generators.

The installation 1 also comprises a battery electrical storage system 18, of the "dimmable" type for example (with a current controller), which may be an auxiliary electrical supply source that is referred to as hybrid, that is to say one which may be either an electrical source or, during a recharging phase, an electricity consuming load.

The installation 1 further comprises an electric vehicle or an electric vehicle charging station 20, which is a hybrid source like the electrical storage system 18, since an electric vehicle may be a reversible electrical storage device ("EV to grid" configuration).

In a variant, the installation 1 comprises, as a variant or additionally, one or more electric vehicles (EV) 20 adapted to act solely as loads ("grid to EV" configuration) when they are connected for recharging.

Electric vehicles are included among critical (or main) loads that may consume large amounts of electrical power and/or consume high electric currents and/or be activated continuously for long periods (more than 10 hours, for example).

The electrical installation 1 further comprises a plurality of domestic electrical loads 22 (or secondary loads), for example including, but not limited to, radiators, household appliances, multimedia devices, computer equipment and light fittings. The domestic (or secondary) loads consume less electrical power or a lower current than the critical loads, and their operation is usually intermittent.

These domestic loads 22 are connected through respective protective and switching devices 24, 26, circuit breakers for example, on a domestic electrical panel 30. This domestic electrical panel 30 may, for example, be a conventional domestic panel limited to 63 amperes (63 A). The domestic electrical panel 30 is connected to the electricity distribution system 10 via a switch 28 for providing local isolation.

The domestic electrical panel 30 and its supply cable are protected by a protection device 46.

The electrical installation 1 may also comprise a plurality of loads to be supplied with electricity, these loads possibly comprising a water heater, a heat pump (or air conditioner, or more generally any domestic heating installation), or an air conditioner or a pool heating system. These other loads to be supplied may be connected to the electricity distribution system 10 through an electrical panel such as the domestic electrical panel 30, or, in a variant, may be connected directly to the electricity distribution system 10.

The electricity distribution system 10 is configured for distributing the electricity supplied by the respective main and auxiliary supply sources to the connected loads, on the basis of individual requirements, while providing overall safety, notably by ensuring that the current carried does not exceed the predetermined current thresholds.

The electricity distribution system 10 may comprise a lightning protection device 32, connected to earth at a point 33. Preferably, the lightning protection device 32 is connected, in the electricity distribution system 10, next to and downstream of the electricity distribution network connection, as detailed more fully below with reference to the embodiments.

The electricity distribution system 10 comprises an electrical connecting device 36 arranged for distributing an electric current in the installation, in the manner of a distributor.

The connecting device 36 is arranged to be connected, respectively, to the electricity distribution network 12, which forms a main electrical supply source, via a main switching device 38, and to each auxiliary electrical supply source 34, via an associated switching device referred to as an auxiliary device.

Each switching device, whether main or auxiliary, is for example a switch or a circuit breaker, configured for switching between two states which respectively allow or prevent the flow of electric current to the electrical conductors to which it is connected.

In the example of FIG. 1, the photovoltaic generator 16 is connected to the connecting device 36 via a switching device called an auxiliary switching device 40, the electrical storage system 18 is connected via an auxiliary switching device 42, and the electric vehicle 20 is connected to the connecting device 36 via an auxiliary switching device 44.

The domestic electrical panel 30, to which the loads 20 are connected, is connected to the connecting device 36 via what is called the load switching device 46.

If the distribution system 10 comprises a lightning protection device 32, this is connected to the connecting device 36 via an associated switching device 45, the switching device 45 being a circuit breaker, for example. According to a variant, the lightning protection device 32 and the switching device 45 are combined.

The lightning protection device is connected to the connecting device 36 near to, for example next to, the connection point of the main supply source Advantageously, by minimizing the wire length between the connection of the lightning protection device and the connection point of the main source, the efficiency of the lightning protection device is maximized.

Preferably, the lightning protection device is connected to the connecting device at a connection point 52 located near to (for example, immediately adjacent to) the connection point 58 to which the electricity distribution network 12 is connected. The electrical connecting device 36 is formed by one or more electrical conductors or busbars, each busbar being associated with an electrical phase and one being associated with the neutral line (known as the neutral conductor), depending on the type of installation.

In a variant, some installations have no neutral conductor.

The busbars are made of copper, for example.

According to a variant, each busbar is formed by a plurality of conductive sections, electrically connected to form a conducting path.

The electrical connecting device 36 may be considered to be linear (also called a "comb connector"), having a plurality of "stages", each stage corresponding to a busbar. Advantageously, all the elements of the electricity distribution system 10 of the installation 1, namely the supply sources and the loads, are connected to each busbar as detailed below, the connecting device 36 enabling the connection to be made on one connection stage.

The electrical connecting device 36 comprises a first end 53, for example the left-hand end in FIG. 1, and a second end 55, for example the right-hand end in FIG. 1.

The terms "first end" and "second end" here refer to the spatial arrangement of the connecting device 36. The respective references 53 and 55 denote the respective opposite ends (or edges) of the connecting device 36, not the connection points (or "pins") used for electrical connections to the connecting device 36.

In the following text, what is referred to as a first end (or second end) connection point is a connection point near the first end (or second end respectively), in the sense of spatial proximity.

In a variant, it is the right-hand end of the connecting device 36 that is the first end, while the left-hand end of the connecting device 36 is the second end.

In other words, since the connecting device 36 is linear, the first and second ends respectively denote the opposite ends of this connecting device.

The arrangement of the electricity distribution system 10 is such that each electrical supply source, for example the distribution network on one hand and the auxiliary electrical supply sources on the other hand, is connected to the connecting device 36 via a corresponding switching device near one of the opposite ends, the loads being connected to the connecting device between the respective supply sources.

Each switching device is preferably bidirectional.

In other words, each switching device comprises a first connection point, which is an input (or upstream) or output (or downstream) point, depending on the direction of the electric current, and a second connection point, which is an output (downstream) or input (upstream) point, depending on the direction of the electric current. In other words, the connection points are located on either side of the switching device.

In the example of FIG. 1, the main switching device 38 comprises a first connection point 56 et un second connection point 58.

In the proposed electricity distribution system 10, the main electrical supply source (for example, the distribution network 12) is connected to the first connection point 56 of the main switching device 38, the second connection point 58 of the main switching device 38 being connected to the connecting device 36, near the first end 53 of the connecting device 36.

In other words, the main electrical supply source (for example, the distribution network 12) is connected to the connecting device 36, via the switching device 38, near the first end of the connecting device.

The auxiliary supply sources 14 are connected beside each other, near the second end 55 of the connecting device.

In the embodiment of FIG. 1, the photovoltaic generator 16 is connected to the first connection point 60 of the auxiliary switching device 40, the second connection point 62 of the auxiliary switching device 40 being connected to the connecting device 36.

The battery electrical storage system 18 is connected to the first connection point 64 of the auxiliary switching device 42, the second connection point 66 of the auxiliary switching device 42 being connected to the connecting device 36.

The electric vehicle 20, forming part of the auxiliary electrical supply sources 14 in the illustrated embodiment, is connected to the first connection point 68 of the auxiliary switching device 44, the second connection point 70 of the auxiliary switching device 44 being connected to the connecting device 36.

The domestic electrical panel 30, carrying the loads 22, is connected to the first connection point 72 of the load switching device 46, the second connection point 74 of the load switching device 46 being connected to the connecting device 36.

The connections are arranged so that the load(s) are each connected at what is referred to as an intermediate connection point, located between the first end connection point, used for connecting the main supply source, and the or each second end connection point, used for connecting the auxiliary electrical supply sources.

The number of connection points in the connecting device may be varied according to the embodiments concerned, and may be any number. In particular, the number of load and auxiliary electrical supply sources is variable.

In other words, the arrangement of the electricity distribution system 10 is such that the sources are respectively connected near the ends of the connecting device 36, the distribution network being connected near a first end (or at a first side) and the auxiliary supply source(s) being connected near the second end (or at another side), opposite the first end, and all the loads are connected between the sources.

In one embodiment, all the auxiliary supply sources 14 are connected to the connecting device 36, starting from the second end 55 of the connecting device 36 and continuing towards the first end 53 of the connecting device, one after another, regardless of whether the auxiliary supply sources are solely suppliers of electricity (a photovoltaic generator, for example) or hybrid auxiliary supply sources (hybrid sources) which are both suppliers and consumers of electricity.

In one embodiment, starting from the second end 55 of the connecting device 36 and continuing towards the first end 53 of the connecting device, the auxiliary electrical supply sources (e.g. 16 and 18) are connected first, followed by the hybrid auxiliary supply sources (e.g. 20), which may operate both as electrical supply sources and as loads.

Additionally, the arrangement of the electricity distribution system 10 is such that each electrical supply source, for example the distribution network on one hand and the auxiliary electrical supply sources on the other hand, is connected to the connecting device via a corresponding switching device.

Advantageously, the connecting device 36 is designed (or calibrated) to support and distribute an electric current called the maximum current threshold, equal to the maximum of the maximum electric current supplied by the electricity distribution network (or, more generally, by the source(s) connected near the first end) and the sum of the maximum electric currents supplied by the auxiliary electrical source or the plurality of auxiliary electrical sources (or, more generally, by the source(s) connected near the second end).

For example, if the main supply source is calibrated so as not to exceed 63 amperes, and the auxiliary supply sources supply 26 amperes and 22 amperes respectively, amounting to a maximum total of 48 amperes, the connecting device 36 is calibrated to support 63 amperes, while being capable of supplying a total of 111 amperes to the loads connected between the respective main and auxiliary sources.

Advantageously, this allows simplification and saving of resources, for example as regards the material forming the busbars of the connecting device, by comparison with a conventional distributor which, in order to support the distribution of 111 amperes, must be designed accordingly.

In the embodiment of FIG. 2, the installation 1 further comprises a standby generator 76, for example a generating set, the connecting device 36 being configured so that it also distributes the electricity supplied by the backup generator 76 when the latter replaces the distribution network and forms the alternative main electricity source.

The backup generator 76 (or backup source) comprises an interlocking (or safety engagement) device 78, enabling the main switching device and the switching device 75, through which the backup generator is connected to the connecting device 36, to be interlocked so as to ensure that only one of the main electrical supply sources 12 and 76 is connected to the connecting device 36 at the same time. The switching device 75 is, for example, an isolating switch.

Thus, by means of the interlocking device 78, it is possible to choose between the backup source 76, on the one hand, and the distribution network 12, on the other hand, for supplying the connecting device 36 via the first end 53 of the connecting device.

FIG. 3 illustrates in greater detail an embodiment of the electricity distribution system 10 in the case of a single-phase installation with neutral, in which the electric current is routed by a phase conductor (denoted L) and a neutral conductor (denoted N), also called a neutral line. Similarly, as shown in FIG. 3, each electrical source and each electrical load comprises a phase connector (L) and a neutral connector (N). In some cases, electrical loads may further comprise an earthing connector (denoted PE).

In this example, therefore, there are two conductors (neutral N and phase L) for each conducting path.

In particular, the connecting device comprises a busbar 35L, which is a phase conductor, and a busbar 35N, which is a neutral conductor.

Additionally, in the embodiment of FIG. 3, a supplementary load 21, for example an electric vehicle acting purely as an electricity consumer, is connected to the connecting device 36 via a load switching device 43.

Furthermore, the electrical connections comprise measuring devices, represented by the symbol "W" in the figure, which are capable of measuring the electrical power supplied by the electrical sources (notably by the network 12 and by each auxiliary supply source 16, 18, 20) and/or the electrical power flowing through the various switching devices.

The measuring devices may be, for example, one or more current sensors and/or voltage sensors and/or wattmeters (W) and/or any equivalent or appropriate measuring device.

For example, a first measuring device 75 is associated with the network 12, measuring devices 79, 81 are associated with the auxiliary supply sources 16, 18, and devices 83, 85 are associated with the hybrid sources or loads 20, 21.

These measuring devices supply measurements of current and/or voltage and/or power which are supplied to an electronic control device 100, which is configured for automatically controlling the distribution of electric current among the electrical loads, notably in the case where the maximum current threshold for which the connecting device was calibrated is exceeded, but also in the case of maximization of self-consumption and other common scenarios.

The electronic control device 100 is associated with control lines, each provided with a controllable switch 130, 132, such as a relay or a semiconductor power switch, enabling the switching and protection devices 24-1 and 24-2, respectively, to be activated in order to regulate the electrical power consumption of the loads 22 connected to the various branches.

Additionally, the electronic control device comprises, or is connected to, a communication interface 140, providing various functions for communication, with an external network (e.g. the internet), for example, enabling remote control functions to be implemented.

The electronic control device 100 is configured for implementing a method for managing the distribution of the electric current supplied/consumed, on the basis of measurements of current and/or voltage and/or power supplied by the various measuring devices (e.g. sensors), and the current or power limits that are set, notably, by the calibration of the connecting device 36 and by the electricity distribution network. For example, the electronic control device 100 is configured for managing supply parameters of at least some of the electrical loads in order to reduce the current consumption, and/or for managing at least some of the operating parameters of at least some of the auxiliary electrical supply sources in order to reduce the current delivered by these sources.

In the embodiment of FIG. 3, the lightning protection device 32 comprises one or more varistors connected between the connecting device 36 and an earth connection point 33 of the electrical installation connected to the terminal block 67. For example, a varistor is connected to each electrical conductor 35L, 35N (one for the phase L and for the neutral N) of the connecting device 36, via a switching device 45, which is preferably a switching and protection device, such as a circuit breaker.

In the embodiment of FIG. 3, the backup source 76 comprises a protection device 65, connected between the isolating switch 75 and the terminal block 67.

Figure 4:
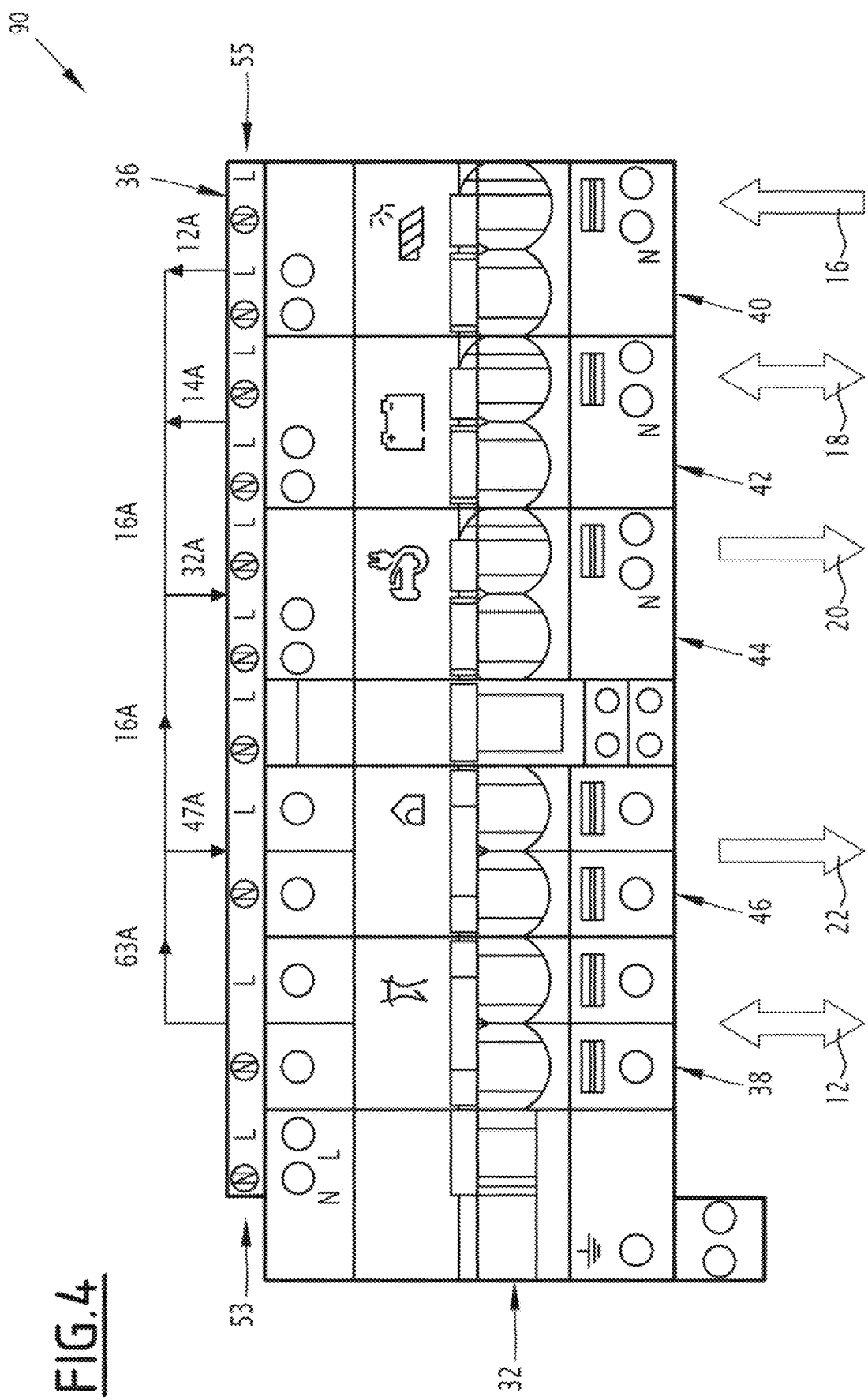
FIG. 4 shows schematically a view of an assembly incorporating an electricity distribution system according to one embodiment.

FIG. 4 is a schematic representation of a view of an assembly 90 incorporating an electricity distribution system comprising a connecting device 36 according to one embodiment.

In this embodiment, the assembly 90 is, for example, an electrical panel (for example a wall-mounted panel or an electrical cabinet).

In the assembly 90, the electricity distribution system is configured for distributing the electricity received from a main supply source, which is the distribution network 12, and from the auxiliary supply sources 16, 18, towards the respective loads 20, 22.

The arrows shown under the assembly 90 indicate the direction of flow of the electric current forming an electrical conduction path in the electricity distribution system, in an example of operation.

The connecting device 36 comprises, on its front, phase connection points L alternating with neutral connection points N, placed at a chosen distance, for example 18 mm and 36 mm, suitable for the connection of the corresponding switching devices, such as circuit breakers, for domestic installations.

The assembly 90 is particularly compact.

In an advantageous embodiment, the connecting device 36 forming part of the assembly 90 comprises, on a visible face, indicator elements, for guiding an electrician during installation, notably by indicating the order of arrangement of the connections of the electrical devices (sources and loads), starting with the lightning protection device, followed by the electricity distribution network, any loads, and then the auxiliary electrical sources, hybrid or otherwise. The indicator elements are, for example, positioned at the connection terminals (or "pins") for connection to the respective connection points of the connecting device 36.

Advantageously, the presence of indicators makes it possible to facilitate the connection of the electrical devices to the pins of the connecting device 36.

The source 18 is a hybrid source that can operate both as an electrical supply source and as an electricity consuming load.

Similarly, the distribution network 12 is a remote source from which energy can be withdrawn or into which energy can be injected, being capable of receiving the electricity produced by one or more of the auxiliary supply sources when the electricity produced by these auxiliary supply sources is not consumed by the loads connected between the main supply source and the auxiliary supply sources.

By way of an illustrative example, an electrical conduction path is shown with the aid of arrows above the connecting device 36. In this example, the electricity distribution network 12 supplies 63 A. The domestic loads 22 (the reference 22 here denoting the distribution panel 30 comprising a plurality of connected domestic loads) consume 47 A.

Additionally, the auxiliary supply source 16 (e.g. a photovoltaic generator) injects 12 A into the connecting device 36, and the auxiliary supply source 18 (e.g. a battery electrical storage system) injects 4 A into the connecting device 36. Thus the auxiliary electrical supply sources supply 16 A in this example.

The electric vehicle 20 consumes a current of 32 A for the purpose of charging, this current being supplied via the connecting device 36, by the remaining 16 A of the current supplied by the electricity distribution network on the one hand, and, on the other hand, by the auxiliary supply sources 16 and 18 jointly.

Overall, in the example shown in FIG. 4, the loads of the electrical installation consume 79 A at the same time.

Advantageously, in this particular case, a connecting device calibrated to route 63A is capable of supplying the current consumed, without requiring the implementation of electronic control of the electricity distribution. This is because, owing to the proposed arrangement, the conducting path is such that the limit of 63 A (the maximum permitted current threshold) is not exceeded in any of the respective conductors of the connecting device 36.

Evidently, the example of FIG. 4 is provided by way of non-limiting example, and there are many other feasible arrangements of the distribution of the electric current between the main supply source, the auxiliary supply sources and the loads, including the particular cases in which the hybrid sources operate as loads and therefore consume electricity.

The electricity distribution system 10 and the connecting device 36 have been described above for the case of a single-phase installation. Evidently, in a variant, in a polyphase electricity distribution system 10 such as a three-phase and neutral system, the configurations described are generalized for each of the electrical phases and the neutral line. In particular, the connecting device comprises as many busbars as there are phases, with the addition of a neutral conductor if necessary.

In a variant, the distribution system may also be generalized in the case where the installation is polyphase without a neutral conductor.

Advantageously, generalization for a polyphase system is a simple matter, the respective sources and loads being connected by corresponding polyphase connection points.

Figure 5:
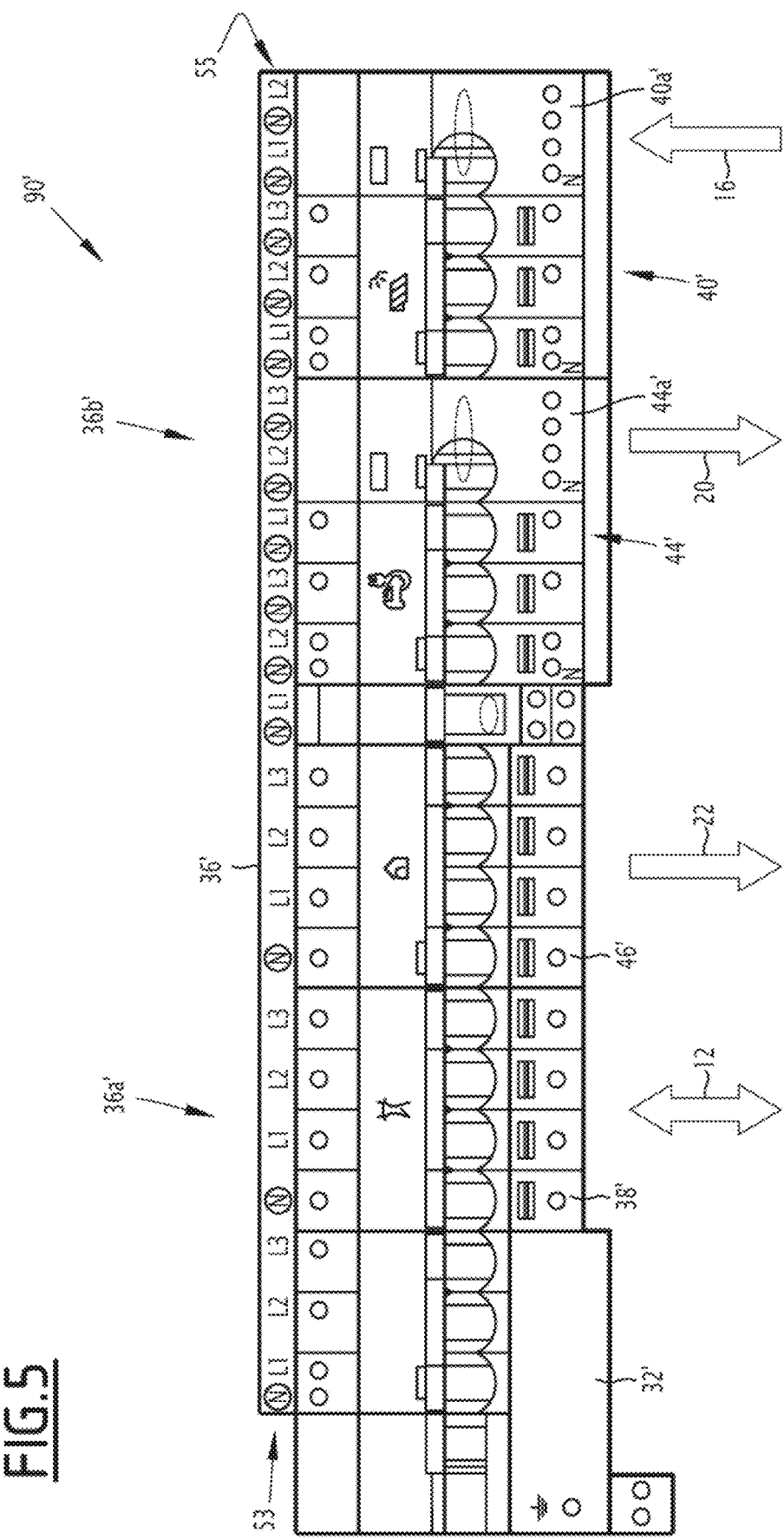
FIG. 5 shows schematically a view of an assembly incorporating an electricity distribution system according to another embodiment.

FIG. 5 shows schematically a view of an assembly 90' incorporating an electricity distribution system according to a variant of the embodiment of FIG. 4, incorporating an electricity distribution system comprising a connecting device 36' according to one embodiment. The same elements of the assembly 90' are denoted with the same reference numerals as in the preceding figures, particularly with the use of a prime for a variant of an element. FIG. 5 shows a three-phase embodiment with the phases L1, L2, L3 and the neutral line N.

In this embodiment, the assembly 90' is, for example, an electrical panel, for example a wall-mounted panel, or an electrical cabinet.

In the assembly 90', the electricity distribution system is configured for distributing the electricity received from a main supply source, which is the distribution network 12, and from the auxiliary supply sources 16, towards respective loads 20, 22.

The arrows shown under the assembly 90' indicate the direction of flow of the (three-phase) electric current forming an electrical conduction path in the electricity distribution system, in an example of operation.

The electrical connecting device 36' essentially corresponds to the electrical connecting device 36 of FIGS. 1 to 4. By contrast with FIGS. 1 to 4, the connecting device 36' is suitable for use in an assembly 90' for three-phase currents. The electrical connecting device 36' may be considered to be linear (also called a "comb connector"), having a plurality of "stages", each stage corresponding to a busbar, one busbar being provided for each phase L1, L2, L3 and the neutral conductor N. The connection points are therefore three-phase.

The connecting device 36' comprises, on its front, in a first segment 36a', three-phase connection points comprising electrical connection points for the phases L1, L2, L3, alternating as a group with neutral connecting terminals N, placed at a chosen distance, for example 18 mm and 36 mm, suitable for the connection of the corresponding switching devices 32', 38', 40', 44', 46', such as circuit breakers, for domestic installations for the lightning protection device, the network 12 and the domestic electrical loads 22.

The connecting device 36' also comprises, on its front, in a second segment 36b' adjacent to the first segment 36a', connection points comprising electrical connecting terminals of the phases L1, L2, L3, alternating with neutral connecting terminals N, placed at a chosen distance, for example 18 mm and 36 mm, suitable for the connection of the corresponding switching devices, such as circuit breakers, particularly for the load relating to the electric vehicle, that is to say the charging station or the vehicle, and the auxiliary supply sources 16. The circuit breaker, for the auxiliary supply source 16 or the load relating to the electric vehicle 20, for example, is connected to the three phases L1, L2, L3 and to the neutral conductor N, respectively. In one embodiment, the circuit breaker(s) are not connected to all the connection points above them. For example, the switching device 44' is only connected on the left to the connecting terminal of the neutral conductor N and then to the connecting terminals of the conductors L2, L3 and L1 of the connecting device 36'. The other connecting terminals above the switching device 44' are unused.

In one embodiment, other products, such as an undervoltage release 44*a*', 40*a*', may be connected laterally to the auxiliary switching devices 40, 44 without being connected to the connecting device 36'.

The assembly 90 is particularly compact.

Figure 6:
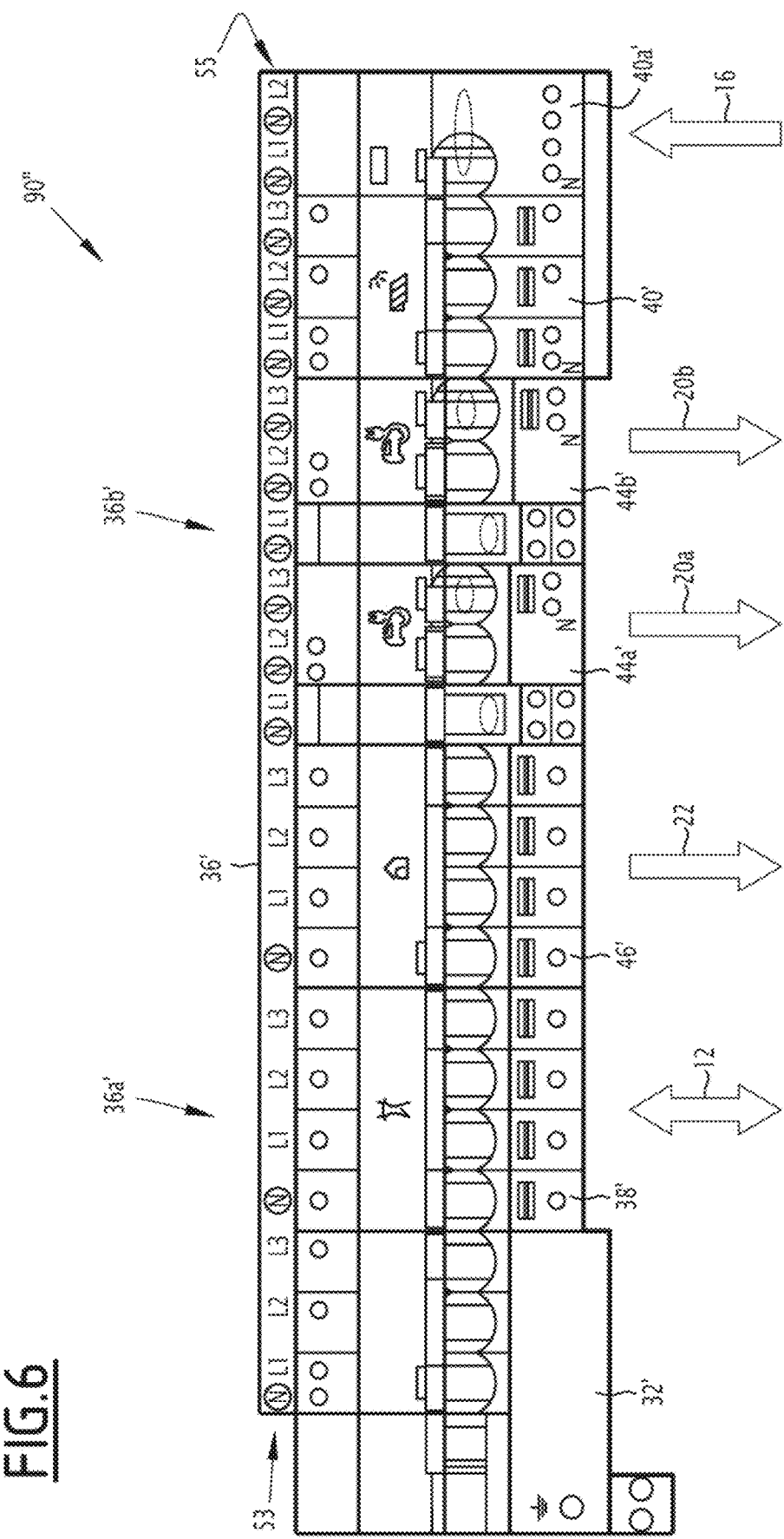
FIG. 6 shows schematically a view of an assembly incorporating an electricity distribution system according to another embodiment.

In an advantageous embodiment as described for the embodiment of FIG. 4, the connecting device 36' forming part of the assembly 90' comprises, on a visible face, indicator elements, for guiding an electrician during installation. FIG. 6 shows schematically a view of an assembly 90" incorporating an electricity distribution system according to a variant of the embodiment of FIG. 5, incorporating an electricity distribution system comprising a connecting device 36' according to an embodiment which is identical to the connecting device 36' of FIG. 5. The same elements of the assembly 90" are denoted with the same reference numerals as in FIG. 5. FIG. 6 shows a three-phase embodiment with the phases L1, L2, L3 and the neutral line N.

In this embodiment, the assembly 90" is, for example, an electrical panel, for example a wall-mounted panel, or an electrical cabinet.

In the assembly 90", the electricity distribution system is configured for distributing the electricity received from a main supply source, which is the distribution network 12, and from the auxiliary supply sources 16, towards the respective loads 20*a*, 20*b*, 22.

The arrows shown under the assembly 90" indicate the direction of flow of the (single- or three-phase) electric current forming an electrical conduction path in the electricity distribution system, in an example of operation.

By contrast with FIG. 5, the assembly comprises two auxiliary switching devices 44*a*", 44*b*" for the loads 20*a*, 20*b*. The two switching devices are each single-phase and are connected only to single-phase points, in this case phase L2, and for the neutral conductor N. Each of the loads 20*a*, 20*b* is, for example, an electric vehicle.

In FIGS. 5 and 6, all the purely electricity consuming loads are electrically connected and are also located between the main supply source and the auxiliary supply source(s).

Figure 7:
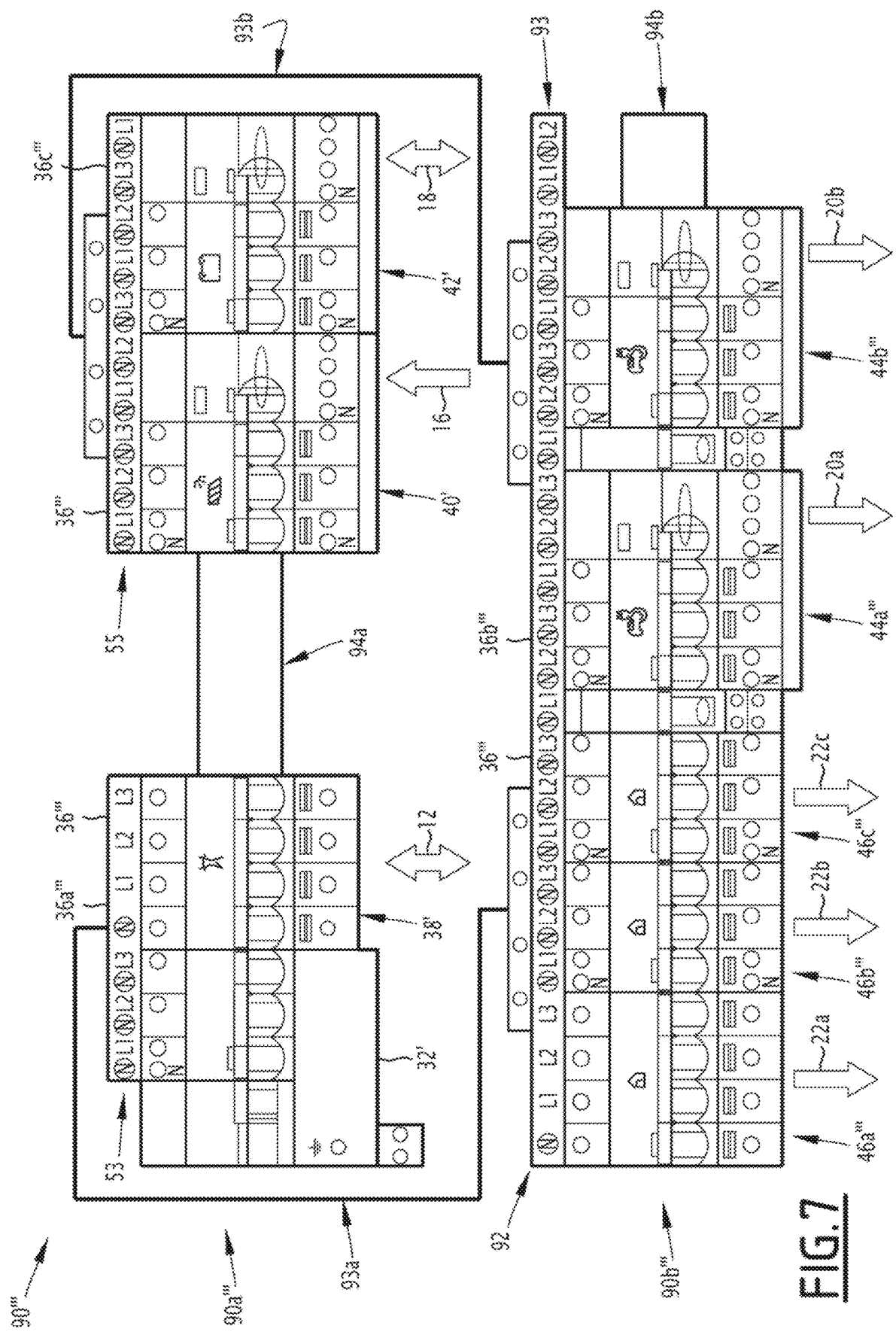
FIG. 7 shows schematically a view of an assembly incorporating an electricity distribution system according to another embodiment.

FIG. 7 shows schematically a view of an assembly 90''' incorporating an electricity distribution system according to a variant of the embodiment of FIG. 5, incorporating an electricity distribution system comprising a connecting device 36''' according to one embodiment. The same elements of the assembly 90''' are denoted with the same reference numerals as in the preceding figures, particularly with the use of three primes for a variant of an element. FIG. 7 shows a three-phase embodiment with the phases L1, L2, L3 and the neutral line N.

In this embodiment, the assembly 90''' is, for example, an electrical panel, for example a wall-mounted panel, or an electrical cabinet.

In the assembly 90''', the electricity distribution system is configured for distributing the electricity received from a main supply source, which is the distribution network 12, and from the auxiliary supply sources 16, 18, towards the respective loads 20*a*, 20*b*, 22*a*, 22*b*, 22*c*. The loads 20*a*, 20*b*, 22*a*, 22*b*, 22*c* correspond, respectively, to the loads 20, 22 of FIGS. 1 to 4. The assembly 90''' comprises two rows, notably an upper row 90*a*''' and a lower row 90*b*'''. In another embodiment, the assembly 90''' comprises three rows.

The arrows shown under the assembly 90''' indicate the direction of flow of the (three-phase) electric current forming an electrical conduction path in the electricity distribution system, in an example of operation.

The electrical connecting device 36''' corresponds electrically to the electrical connecting device 36' of FIGS. 5 and 6. The electrical connecting device 36''' comprises a plurality of linear segments 36*a*''', 36*b*''', 36*c*''' (also called a "comb connector"), having a plurality of "stages", each stage corresponding to a busbar, one busbar being provided for each phase L1, L2, L3 and the neutral conductor N.

The connecting device 36''' comprises, on its front, for each segment 36*a*''', 36*b*''', 36*c*''', phase connection points comprising electrical connection points for the phases L1, L2, L3, alternating, particularly as a group, with neutral connecting terminals N of phases L1, L2, L3. The connecting terminals are placed at a chosen distance, for example 18 mm and 36 mm, suitable for the connection of the corresponding switching devices, such as circuit breakers.

The first segment 36*a*''' and the third segment 36*c*''' are arranged in the first row 90*a*''', and the second segment 36*b*''' is arranged in the second row 90*b*'''.

The conductors, for example the busbars, of the first segment 36*a*''' are, respectively, electrically connected or linked to the corresponding conductors, busbars for example, of the second segment 36*b*''', particularly at a first end 92, or near the first end, of the second segment 36*b*'''. The conductors, for example the busbars, of the third segment 36*c*''' are, respectively, electrically connected or linked to the corresponding conductors, busbars for example, of the second segment 36*b*''', particularly at a second end 93, or near the second end, of the second segment 36*b*'''. For example, the electrical connections between the segments 36*a*''', 36*b*''' and 36*c*''' are established by means of one or more wires 93*a*, 93*b*.

The switching devices 32', 38', together with the circuit breakers for the lightning protection device and the network 12, are connected to the first segment 36*a*'''. The switching devices 44*a*''', 44*b*''', 46*a*''', 46*b*''', 46*c*''', together with the circuit breakers for the domestic electrical loads 22*a*, 22*b*, 22*c*, 20*a*, 20*b*, are connected to the second segment 36*b*'''. The switching devices 40', 42', together with the circuit breakers for the auxiliary supply sources 16, 18, are connected to the third segment 36*b*'''. In an advantageous embodiment as described for the embodiment of FIG. 7, the connecting device 36''' forming part of the assembly 90''' comprises, on a visible face, indicator elements for guiding an electrician during installation.

FIG. 7 also shows two mechanical attachment rails 94*a*, 94*b* for the various switching devices forming the two rows 90*a*''', 90*b*'''.

Electrically, that is to say in terms of the electrical circuit, the embodiment of FIG. 7 is identical to the embodiment of the preceding figures, particularly FIGS. 5 and 6. For example, the second end 55 is located, in electrical terms, on the left of the third segment 36*c*''' of the connecting device 36''' in FIG. 7. Therefore, the switching devices of the auxiliary electrical supply sources are connected to a second end connection point, particularly in electrical terms at least, of the connecting device 36''', located near a second end 55. Additionally, all the purely electricity consuming loads are electrically connected to the connecting device 36''' between the main supply source 12 and the auxiliary supply source(s) 16, 18. In other words, each load switching device is connected to an intermediate connection point which is located electrically, that is to say in terms of the electrical circuit, between said first connection point and the, or each, second connection point.

Figure 8:
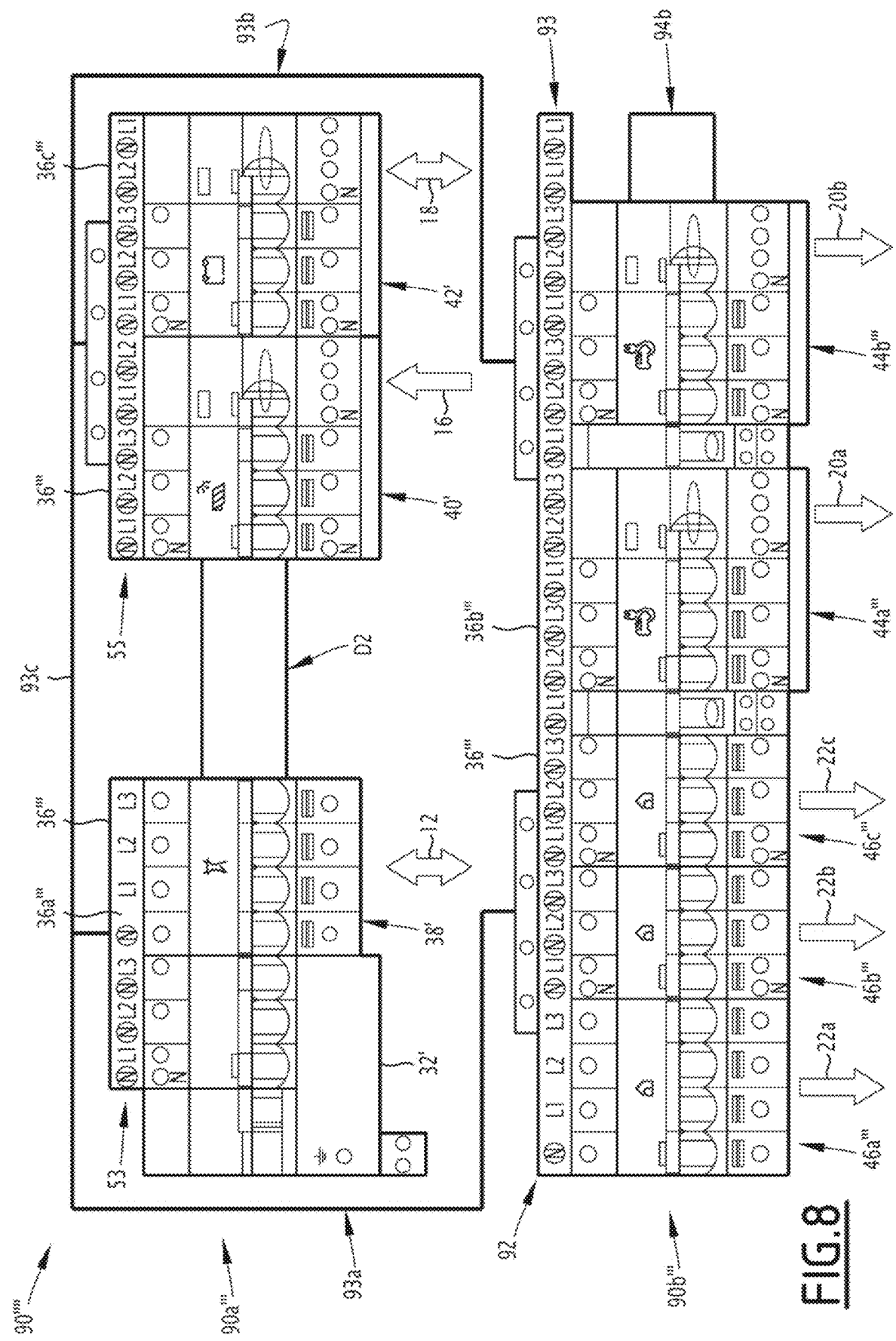
FIG. 8 shows schematically a view of an assembly incorporating an electricity distribution system according to another embodiment.

FIG. 8 shows schematically a view of an assembly 90'''' incorporating an electricity distribution system according to a variant of the embodiment of FIG. 7. The only difference from the assembly 90''' of FIG. 7 is a supplementary electrical connection 93*c* between the first segment 36*a*''' and the third segment 36c''' of the connecting device 36'''. The conductors, for example the busbars, of the third segment 36c''' are, respectively, electrically connected to the corresponding conductors, for example busbars, of the first segment 36a'''. Because of the supplementary electrical connection 93c, if the auxiliary supply sources 16, 18 produce energy in excess of the energy consumption of the loads 20a, 20b, 22a, 22b, 22c, this excess energy may be injected directly into the electricity distribution network 12, without passing through the second segment 36b''' of the connecting device 36'''. This supplementary electrical connection 93c enables the flow of electric current in the second segment 36b''' of the connecting device 36''' to be reduced. The purely electricity consuming loads 22a, 22b, 22c 20a, 20b are electrically connected to the connecting device 36''' between the main supply source 12 and the auxiliary supply source(s) 16, 18.

Figure 9:
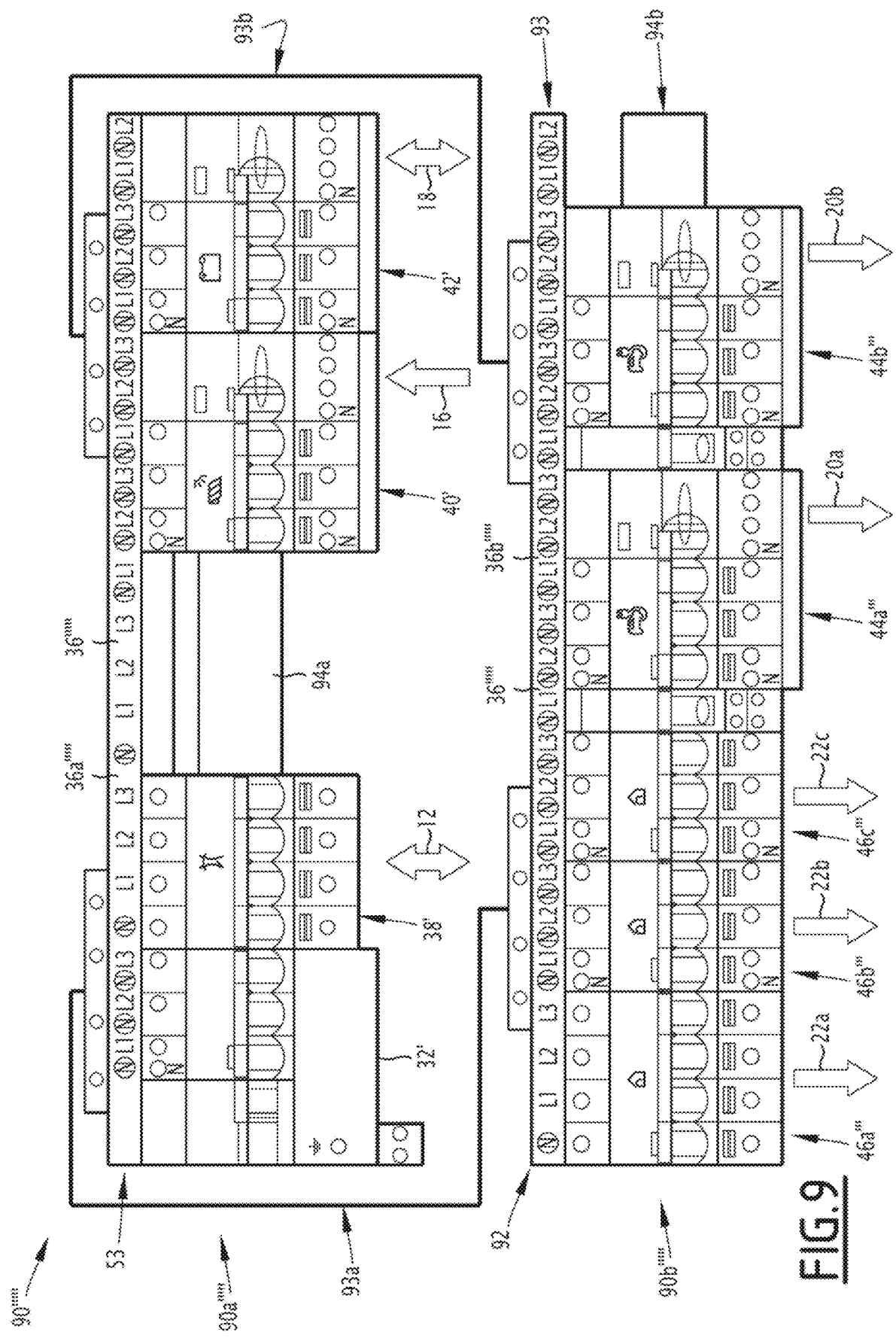
FIG. 9 shows schematically a view of an assembly incorporating an electricity distribution system according to another embodiment.

FIG. 9 shows schematically a view of an assembly 90'''' incorporating an electricity distribution system according to a variant of the embodiment of FIG. 8. The only difference from the assembly 90''' of FIG. 7 is that the connecting device 36'''' comprises only a first segment 36a'''' and a second segment 36b''''. The first segment 36a'''' incorporates in its intermediate part the supplementary electrical connection function 93c of the connecting device 36''' of FIG. 8.

Advantageously, the proposed distribution system is particularly compact, and its implementation is suitable for an existing installation, the electrician's work being facilitated.

Additionally, for the same connecting device, it is possible to modify the number of auxiliary electrical supply sources, for example, by adding a supplementary auxiliary electrical supply source and removing one of the loads, for example, provided that the supplementary auxiliary electrical supply source is connected in such a way that all the purely electricity consuming loads are electrically connected between the main supply source and the auxiliary supply source(s).

Advantageously, overload protection is provided for the electricity distribution system, and maintenance is facilitated by the presence of a single cut-off point for the electricity distribution system, ensuring the safety of the operator.

The invention claimed is:

1. An electricity distribution system for distributing electric currents between an electricity distribution network and a domestic distribution installation, wherein the electricity distribution system comprises:
   a connecting device arranged for distributing an electric current in the domestic distribution installation, from sources comprising the electricity distribution network and at least one auxiliary electrical supply source, to at least one electricity consuming load,
   wherein the connecting device comprises at least one linear segment, each linear segment comprising a plurality of electrical conductors adapted for routing the electric current along an electrical conduction path,
   the electricity distribution system comprising a main switching device, connected between the electricity distribution network and a first connection point of each electrical conductor of the plurality of electrical conductors of the connecting device, the main switching device being configured for switching between two states which, respectively, allow or prevent a flow of electric current from the electricity distribution network to the connecting device,
   for the, or each, auxiliary electrical supply source, respectively, an auxiliary switching device, connected between said auxiliary electrical supply source and a respective second connection point of each electrical conductor of the plurality of electrical conductors of the connecting device, each auxiliary switching device being configured for switching between two states which, respectively, allow or prevent a flow of electric current from the associated auxiliary electrical supply source to the connecting device,
   the electricity distribution system further comprising at least one load switching device, connected between the at least one electricity consuming load and the connecting device, the load switching device being configured for switching between two states which, respectively, allow or prevent a flow of electric current from the connecting device to the at least one electricity consuming load, the, or each, load switching device being electrically connected to the connecting device at a respective intermediate connection point of each electrical conductor of the plurality of electrical conductors of the connecting device which is located, electrically, between said first connection point and the, or each, respective second connection point,
   wherein a maximum current threshold of the plurality of electrical conductors of the connecting device is equal to a greater of:
      a maximum electric current supplied by the electricity distribution network; or
      total maximum electric current supplied by the at least one auxiliary electrical supply source,
   and further comprising an electronic control device operatively connected to automatically control distribution of the electric current to the at least one electricity consuming load in an amount greater than the maximum current threshold.

2. The electricity distribution system according to claim 1, wherein the first connection point is a first end connection point of the connecting device, located near a first end of the connecting device, and the, or each, respective second connection point is a second end connection point of the connecting device, the, or each, respective second end connection point being located near a second end of the connecting device, opposite the first end of the connecting device.

3. The electricity distribution system according to claim 1, wherein, in said connecting device, each electrical conductor of the plurality of electrical conductors is a busbar made of an electrically conductive material, each busbar being associated with an electrical phase or with a neutral conductor.

4. The electricity distribution system according to claim 3, wherein each electrical conductor of the plurality of electrical conductors is formed by a plurality of conductive sections, electrically connected to form a busbar.

5. The electricity distribution system according to claim 1, wherein at least one of the at least one auxiliary electrical supply source is a hybrid source, configured for supplying or consuming an electric current, the or each hybrid source being connected to the connecting device at a connection point which is located, electrically, between the or each respective second connection point and the or each respective intermediate connection point.

6. The electricity distribution system according to claim 5, wherein at least one of the, or each, hybrid source is a battery electrical storage system or an electric vehicle.

7. The electricity distribution system according to claim 1, wherein at least one of the at least one electricity consuming load is an electric vehicle.

8. The electricity distribution system according to claim 1, wherein the at least one auxiliary electrical supply source comprises one or more photovoltaic generators.

9. The electricity distribution system according to claim 2, further comprising a lightning protection device, connected to the connecting device at a side of the main switching device, particularly opposite the second end of the connecting device.

10. The electricity distribution system according to claim 1, comprising indicator elements, positioned on a visible face of a casing comprising the connecting device, for guiding the connection of the electricity distribution network, the at least one auxiliary electrical supply source and the at least one electricity consuming load in the electricity distribution system.

11. The electricity distribution system according to claim 1, wherein the connecting device is linear.

12. The electricity distribution system according to claim 2, wherein the, or each, load switching device is electrically connected to the connecting device at the, or each, respective intermediate connection point located between said first end connection point and the, or each, respective second end connection point.

13. An electricity distribution installation, comprising the electricity distribution system according to claim 1.

14. The electricity distribution system according to claim 1, wherein the plurality of electrical conductors of the connecting device are capable of supplying current to the at least one electricity consuming load in an amount equal to a total of the maximum electric current supplied by the electricity distribution network and a total of the maximum electric current supplied by each of the at least one auxiliary electrical supply source.

* * * * *